United States Patent
Sasaki et al.

(10) Patent No.: US 10,801,976 B2
(45) Date of Patent: Oct. 13, 2020

(54) METHOD FOR DISPLAYING MEASUREMENT RESULTS FROM X-RAY DIFFRACTION MEASUREMENT

(71) Applicant: Rigaku Corporation, Akishima-shi, Tokyo (JP)

(72) Inventors: Akito Sasaki, Akishima (JP); Akihiro Himeda, Akishima (JP); Yukiko Ikeda, Akishima (JP); Keigo Nagao, Akishima (JP)

(73) Assignee: RIGAKU CORPORATION, Akishima-Shi, Tokyo (JP)

( * ) Notice: Subject to any disclaimer, the term of this patent is extended or adjusted under 35 U.S.C. 154(b) by 85 days.

(21) Appl. No.: 16/104,550

(22) Filed: Aug. 17, 2018

(65) Prior Publication Data
US 2019/0064083 A1 Feb. 28, 2019

(30) Foreign Application Priority Data
Aug. 29, 2017 (JP) ................................. 2017-164269

(51) Int. Cl.
*G01N 23/207* (2018.01)
*G01N 23/20* (2018.01)

(52) U.S. Cl.
CPC ........... *G01N 23/207* (2013.01); *G01N 23/20* (2013.01); *G01N 2223/0566* (2013.01);
(Continued)

(58) Field of Classification Search
CPC .............................. G01N 23/20; G01N 23/207
See application file for complete search history.

(56) References Cited

U.S. PATENT DOCUMENTS

| 5,742,658 A * | 4/1998 | Tiffin | G01N 23/20 257/E21.53 |
| 6,198,796 B1 * | 3/2001 | Yokoyama | G01N 23/20058 378/73 |

(Continued)

FOREIGN PATENT DOCUMENTS

EP 1 517 137 A2 3/2005

OTHER PUBLICATIONS

Extended European Search Report dated Feb. 1, 2019, issued by the European Patent Office in corresponding European Application No. 18186799.5. (6 pages).

*Primary Examiner* — David P Porta
*Assistant Examiner* — Djura Malevic
(74) *Attorney, Agent, or Firm* — Buchanan Ingersoll & Rooney PC

(57) ABSTRACT

A method for displaying measurement results from X-ray diffraction measurement, in which a sample is irradiated with X-rays and the X-rays diffracted by the sample are detected by an X-ray detector, comprises: (1) forming a one-dimensional diffraction profile by displaying, on the basis of output data from an X-ray detector, a profile in which one orthogonal coordinate axis shows $2\theta$ angle values and another orthogonal coordinate axis shows X-ray intensity values; (2) forming a two-dimensional diffraction pattern by linearly displaying X-ray intensity data, for each $2\theta$ angle value and on the basis of output data from the X-ray detector; the X-ray intensity data being present in the circumferential direction of a plurality of Debye rings formed at each $2\theta$ angle by diffracted X-rays; and (3) displaying the two-dimensional diffraction pattern and the one-dimensional diffraction profile so as to be aligned such that the $2\theta$ angle values of both coincide with each other.

5 Claims, 10 Drawing Sheets

(52) U.S. Cl.
CPC . *G01N 2223/304* (2013.01); *G01N 2223/401* (2013.01); *G01N 2223/605* (2013.01); *G01N 2223/62* (2013.01)

(56) References Cited

U.S. PATENT DOCUMENTS

| | | | | |
|---|---|---|---|---|
| 7,123,686 B2* | 10/2006 | Sakata | ............... | G01N 23/20 378/71 |
| 7,145,983 B2* | 12/2006 | Taguchi | ............... | G01N 23/207 378/71 |
| 7,206,378 B2* | 4/2007 | Obata | ............... | G01N 23/20016 378/162 |
| 7,529,340 B2* | 5/2009 | Harding | ............... | G01N 23/207 378/70 |
| 7,535,992 B2* | 5/2009 | Taguchi | ............... | G01N 23/207 378/124 |
| 7,583,789 B1* | 9/2009 | MacDonald | ............... | B82Y 10/00 378/70 |
| 7,801,272 B2* | 9/2010 | Toraya | ............... | G01N 23/207 378/71 |
| 7,885,383 B1 | 2/2011 | He | | |
| 8,000,444 B2* | 8/2011 | Iwasaki | ............... | G01N 23/201 378/71 |
| 8,111,807 B2* | 2/2012 | Ida | ............... | G01N 23/207 378/70 |
| 8,971,492 B2* | 3/2015 | Sasaki | ............... | G01N 23/207 378/70 |
| 9,784,698 B2* | 10/2017 | Durst | ............... | G01N 23/207 |
| 10,161,888 B2* | 12/2018 | Ikeda | ............... | G01N 23/207 |
| 2002/0053641 A1* | 5/2002 | Verbruggen | ............... | G01N 23/20 250/370.09 |
| 2005/0058247 A1* | 3/2005 | Taguchi | ............... | G01N 23/207 378/71 |
| 2005/0084065 A1* | 4/2005 | Taguchi | ............... | G01N 23/205 378/70 |
| 2005/0099423 A1* | 5/2005 | Brauss | ............... | G06T 11/206 345/440 |
| 2005/0103995 A1* | 5/2005 | Yanagiuchi | ............... | G01N 23/225 250/309 |
| 2005/0190881 A1* | 9/2005 | Obata | ............... | G01N 23/20016 378/87 |
| 2006/0078195 A1* | 4/2006 | Vaillant | ............... | A61B 6/032 382/154 |
| 2008/0159479 A1* | 7/2008 | Huang | ............... | G01N 23/20 378/73 |
| 2011/0073757 A1* | 3/2011 | Tanaka | ............... | G01N 23/207 250/307 |
| 2012/0022231 A1* | 1/2012 | Curmi | ............... | B82Y 30/00 530/345 |
| 2013/0028495 A1* | 1/2013 | Star-Lack | ............... | G06T 11/005 382/131 |
| 2014/0278147 A1* | 9/2014 | Sasaki | ............... | G01N 23/207 702/28 |
| 2015/0078526 A1* | 3/2015 | Park | ............... | G01N 23/20 378/71 |

* cited by examiner

FIG. 9

<RING CHARACTERISTIC FACTORS>

- INTESITY RANGE R $$R = X_{max} - X_{min}$$

WHERE $X_{max}$ IS THE MAXIMUM VALUE AND $X_{min}$ IS MINIMUM VALUE

- STANDARD VARIANCE $S^2$ $$S^2 = \frac{\sum_{i=1}^{n}(X_i - \bar{X})^2}{n}$$

WHERE n IS THE NUMBER OF DATA POINTS AND $\bar{X}$ IS THE AVERAGE VALUE

- STANDARD DEVIATION S $$S = \sqrt{\frac{\sum_{i=1}^{n}(X_i - \bar{X})^2}{n}}$$

- COEFFICIENT OF VARIATION CV $$CV(\%) = \frac{S}{\bar{X}} \times 100$$

- NUMBER OF PEAKS AND PEAK WIDTH

- SKEWNESS Sk $$Sk = \frac{n}{(n-1)(n-2)} \cdot \sum_{i=1}^{n}\left(\frac{X_i - \bar{X}}{S}\right)^3$$

- KURTOSIS Ku $$Ku = \left\{\frac{n(n+1)}{(n-1)(n-2)(n-3)} \cdot \sum_{i=1}^{n}\left(\frac{X_i - \bar{X}}{S}\right)^4\right\} - \frac{3(n-1)^2}{(n-2)(n-3)}$$

- NORMALIZED AVERAGE $X_{norm}$ $$X_{norm} = \frac{\bar{X}}{X_{max}}$$

- HISTOGRAM

METHOD FOR DISPLAYING MEASUREMENT RESULTS FROM X-RAY DIFFRACTION MEASUREMENT

BACKGROUND OF THE INVENTION

Field of the Invention

The present invention relates to a method for displaying measurement results from X-ray diffraction measurement, which is a measurement in which a sample is irradiated with X-rays and the X-rays diffracted by the sample are detected by an X-ray detector.

Description of the Related Art

Most solid substances exist in a crystal state. The term "crystalline" typically refers to the state of being in a crystal state or to substances in a crystal state. Many solid substances can be formed by aggregating numerous fine crystal particles. Many substances formed by aggregating crystal particles are referred to as "polycrystalline substances."

X-ray diffraction measurement includes various measurement techniques, such as powder X-ray diffraction measurement, thin-film measurement, micro-area X-ray diffraction measurement, and small-angle X-ray scattering measurement. For example, powder X-ray diffraction measurement is a type of X-ray diffraction measurement that is performed using pulverulent crystals or polycrystalline substances as samples.

In powder X-ray diffraction measurement, an X-ray diffraction pattern for a sample is obtained by a measurement in which an X-ray diffractometer is used. The X-ray diffraction pattern is unique to each crystal phase. Analyzing this X-ray diffraction pattern makes it possible to identify the crystal phases included in a sample. "Crystal phase" is a concept for representing a substance included in a sample when that substance is in a crystal state.

Typically, provided that the number of crystal particles in a sample is sufficiently high and the orientation of lattice planes is random, there will necessarily be a lattice plane at an angle that satisfies diffraction conditions with respect to X-rays incident on the sample. X-rays diffracted by a lattice plane at a diffraction angle $2\theta$ progress along a conical generatrix at a half-vertical angle of $2\theta$ when $2\theta<90°$, and progress along a conical generatrix at a half-vertical angle of $(180°-2\theta)$ when $2\theta>90°$, as shown in FIG. 3. Specifically, X-rays diffracted by a sample comprising pulverulent crystal or polycrystalline substances form numerous cones C having different central angles. When these X-rays are received within the range of an area A0 by an X-ray detection surface of an X-ray detector 10, concentric diffraction patterns such as are shown by the two-dimensional diffraction pattern P2 in FIG. 7 are obtained. Such arcuate diffraction patterns are referred to as "Debye-Scherrer rings" or "Debye rings."

Conventional X-ray diffraction measurement is disclosed in U.S. Pat. No. 7,885,383. FIG. 1 of U.S. Pat. No. 7,885,383 shows that the intensity of X-rays contributing to the formation of a Debye ring is measured along a circumferential direction ($\gamma$ (gamma) direction) orthogonal to the $2\theta$ direction of the Debye ring.

Also, FIG. 4 of U.S. Pat. No. 7,885,383 shows that a $\gamma$-I profile and a two-dimensional diffraction pattern including a plurality of Debye rings are displayed so as to be aligned. A $\gamma$-I profile is an X-ray intensity distribution represented on a coordinate system in which the horizontal axis shows $\gamma$-direction angle values and the vertical axis shows X-ray intensity values. Although U.S. Pat. No. 7,885,383 shows that X-ray intensity data in the circumferential direction of a Debye ring is displayed, a problem is presented in that the display of the circumferential-direction X-ray intensity data is not advantageously used to a sufficient degree.

SUMMARY OF THE INVENTION

The present invention was contrived in view of the conventional problem described above, the purpose of the present invention being to enable the correlation between X-ray information in the circumferential direction of a Debye ring and a $2\theta$ angular position to be recognized in a visually clear and accurate manner.

Technical Premise of the Present Invention

In consideration of powder X-ray diffraction measurement, crystal phase identification in which powder diffraction data is used is conventionally known. "Powder diffraction data" is, e.g., a one-dimensional profile such as is shown by reference P1 in FIG. 7. Analyzing what kinds of substances (crystalline substances) are included in a sample from the position and intensity (height and integral intensity) of peaks in the one-dimensional profile P1 is one example of crystal phase identification in which a powder diffraction pattern is used.

Actual samples to be analyzed often include a plurality of substances rather than only one substance. Specifically, actual samples are often mixed substances. In such cases, because the powder diffraction pattern comprises a combination of diffraction patterns of a plurality of substances, it is difficult for a technician to perform an operation for identifying crystals without further assistance. Thus, it is typical to perform an operation in which a search-match algorithm executed by computer software is used to compare a diffraction pattern obtained by measurement and a database in which numerous known diffraction patterns of substances are stored, thereby determining a plurality of substances included in a sample to be analyzed. The Hanawalt method has long been known as a search-match algorithm.

In recent years, two-dimensional X-ray detectors have become mainstream as X-ray detectors. Until now, crystal phase identification has been performed by converting two-dimensional diffraction data measured by a two-dimensional X-ray detector to a one-dimensional profile and performing search and match using the converted one-dimensional diffraction profile. For an ideal powder sample, a Debye ring that is a diffraction image having the aforementioned arcuate shape or an ellipsoidal shape is imprinted in the two-dimensional diffraction data. This Debye ring corresponds to a diffraction peak in a one-dimensional diffraction profile.

However, when the powder sample is not ideal, such as when the sample contains a strongly oriented substance or coarse particles, then the Debye ring might not have a clear arcuate or ellipsoidal shape but rather be intermittently broken, or a spot-shaped diffraction image might appear. Such sample information cannot be obtained using a conventional scintillation counter or high-speed one-dimensional X-ray detector. Such sample information is reliably created by two-dimensional X-ray detectors.

Displaying a one-dimensional diffraction profile P1 and a two-dimensional diffraction pattern P2 that includes a ring-shaped diffraction image so as to be aligned, as shown in FIG. 7, is conceivable as a method for displaying measurement results from X-ray diffraction measurement. According to such a display method, it is possible to visually capture information J1 about whether preferred orientation is strong and information J2 about whether coarse particles are present. However, in this display method, the Debye ring is displayed with an arcuate or ellipsoidal shape. Therefore, even if the horizontal axis (2θ) of the one-dimensional diffraction profile P1 and the horizontal axis (2θ) of an equatorial (central) portion of the two-dimensional diffraction pattern P2 are caused to coincide and the one-dimensional diffraction profile P1 and the two-dimensional diffraction pattern P2 are displayed so as to be aligned, the difficulty of comparing the position of a peak in the one-dimensional diffraction profile P1 and the position of a fragmentary image or spot-shaped image in the two-dimensional diffraction pattern P2 increases as the 2θ angular position on the two-dimensional diffraction pattern P2 gets further from the equator.

However, the inventors converted two-dimensional image data for the two-dimensional diffraction pattern such that X-ray intensity data for the same 2θ angle in a two-dimensional diffraction pattern P22 is displayed linearly, and furthermore displayed the resulting data so as to be aligned such that the horizontal axis (2θ axis) of the two-dimensional data accurately coincides with the horizontal axis of the one-dimensional diffraction profile P1, as shown in, e.g., FIGS. 5 and 6. This made it possible to visually, quickly, easily, and accurately recognize to which 2θ angular position the fragmentary image or spot-shaped image in the two-dimensional diffraction pattern P22 belongs.

Recently, in order to indicate a candidate for a contained crystal phase or indicate a result following crystal phase identification in a one-dimensional diffraction profile P1, the position and intensity of diffraction peaks obtained from substances have often been displayed using colored bars (i.e., straight lines). For example, in FIG. 6, as pertains to each of the one-dimensional diffraction profile P1 and the two-dimensional diffraction pattern P22, information derived from tungsten carbide (WC) is indicated by a blue color, information derived from titanium carbide (TiC) is indicated by a pink color, information derived from diamond (C) is indicated by a green color, and information derived from silicon carbide (SiC) is indicated by a red color.

According to the present invention, because X-ray intensity information in the circumferential direction of a Debye ring is displayed not in a ring shape but linearly in the two-dimensional diffraction pattern P22, it is possible to display, in an overlaid manner on the two-dimensional diffraction pattern P22, bars that are exactly the same as the colored bars in the one-dimensional diffraction profile P1. As a result, it is possible in particular to easily recognize the position, on the two-dimensional diffraction pattern P22, of a diffraction peak of a candidate for a contained crystal phase. This feature provides an especially great advantage for users.

(Solution 1) A method for displaying measurement results from X-ray diffraction measurement according to the present invention involves a measurement in which a sample is irradiated with X-rays and the X-rays diffracted by the sample are detected by an X-ray detector, wherein the method comprises: forming a one-dimensional diffraction profile by displaying, on the basis of output data from the X-ray detector, a 2θ-I profile within a coordinate system in which one orthogonal coordinate axis shows 2θ angle values and another orthogonal coordinate axis shows X-ray intensity values; forming a two-dimensional diffraction pattern by displaying, linearly for each 2θ angle value and on the basis of output data from the X-ray detector, X-ray intensity data in the circumferential direction of a plurality of Debye rings formed at each 2θ angle by X-rays diffracted by the sample; and displaying the two-dimensional diffraction pattern and the 2θ-I profile so as to be aligned such that the 2θ angle values of both coincide with each other.

According to the present invention, X-ray intensity data for the same 2θ angle in a two-dimensional diffraction pattern is displayed linearly. Moreover, the two-dimensional diffraction pattern and the one-dimensional diffraction profile are displayed so as to be aligned such that a coordinate axis (2θ angle axis) of the two-dimensional diffraction pattern accurately coincides with a coordinate axis (2θ angle axis) of the one-dimensional diffraction profile. As a result, it is possible to visually, quickly, easily, and accurately recognize to which 2θ angular position a fragmentary diffraction image or spot-shaped diffraction image in the two-dimensional diffraction pattern belongs.

(Solution 2) In a second aspect of the present invention, when a desired enlargement range is designated in the two-dimensional diffraction pattern (P22) or in the one-dimensional diffraction profile (P1), both the two-dimensional diffraction pattern (P22) and the one-dimensional diffraction profile (P1) in the designated range are displayed so as to be enlarged at the same ratio and in an aligned state.

(Solution 3) In a third aspect of the present invention, the X-ray diffraction measurement has a step for performing a crystal phase candidate search in consideration of uniformity in the circumferential direction of the Debye rings.

(Solution 4) In a fourth aspect of the present invention, the method comprises: (1) a step for determining β-I data, which is data about "the X-ray intensity" versus "the angle in the circumferential direction of the Debye rings"; (2) a step for classifying the diffraction patterns that correspond to the Debye rings into clusters on the basis of the β-I data; and (3) a step for performing a crystal phase candidate search within the same clusters.

Effect of the Invention

According to the present invention, X-ray intensity data for the same 2θ angle in a two-dimensional diffraction pattern is displayed linearly. Moreover, the two-dimensional diffraction pattern and the one-dimensional diffraction profile are displayed so as to be aligned such that the coordinate axis (2θ angle axis) of the two-dimensional diffraction pattern accurately coincides with the coordinate axis (2θ angle axis) of the one-dimensional diffraction profile. As a result, it is possible to visually, quickly, easily, and accurately recognize to which 2θ angular position a fragmentary diffraction image or spot-shaped diffraction image in the two-dimensional diffraction pattern belongs.

BRIEF DESCRIPTION OF THE DRAWINGS

FIG. 9 is a diagram showing an example of ring characteristic factors utilized in one example of an X-ray diffractometer to which the display method according to the present invention can be applied.

DESCRIPTION OF THE PREFERRED EMBODIMENTS

A method for displaying measurement results from X-ray diffraction measurement according to the present invention is described below on the basis of the embodiments. As shall be apparent, the present invention is in no way limited to these embodiments. There may be cases where the drawings accompanying the present specification show configuration elements at proportions different from actual proportions in order to facilitate comprehension of characteristic portions.

Figure 1:
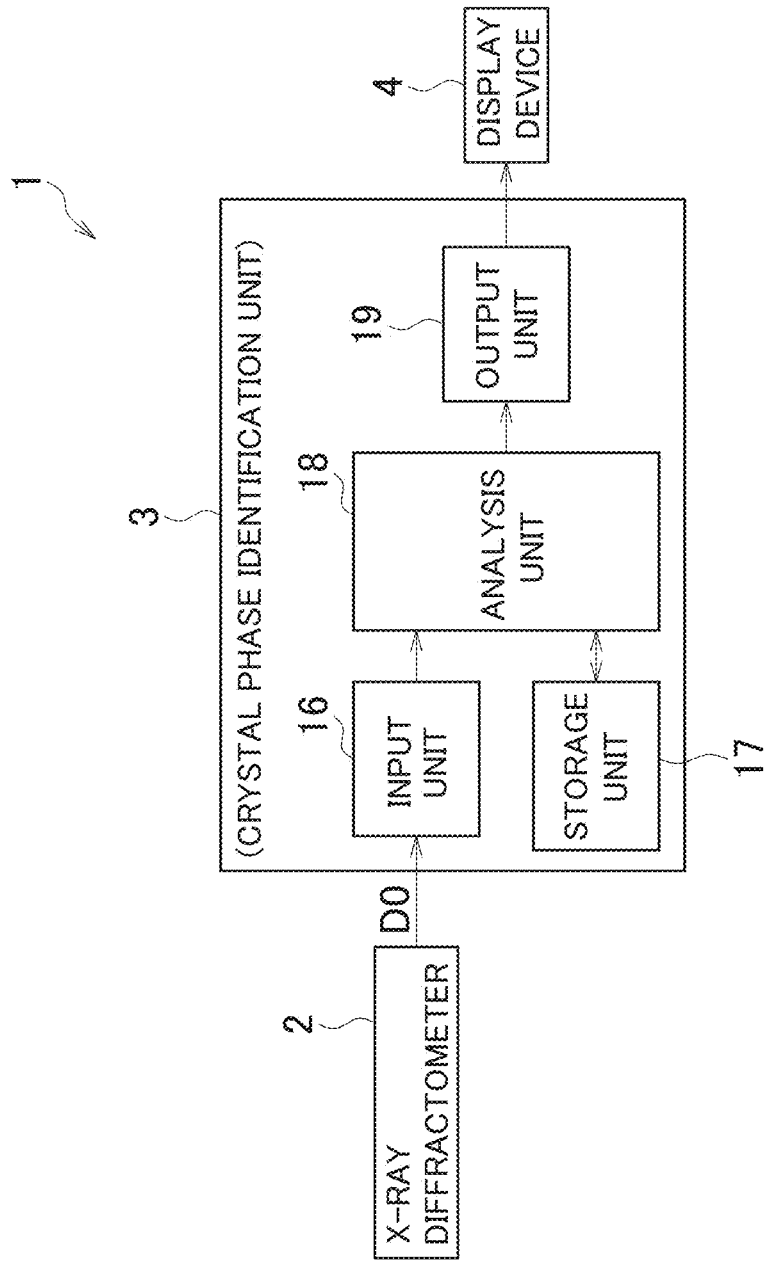
FIG. 1 is a diagram showing one embodiment of an X-ray diffraction measurement apparatus in which the display method according to the present invention is used.

FIG. 1 shows one embodiment of an X-ray diffraction measurement apparatus that is an apparatus for executing the method for displaying measurement results from X-ray diffraction measurement according to the present invention. The X-ray diffraction measurement apparatus 1 shown in FIG. 1 has an X-ray diffractometer 2, a crystal phase identification unit 3, and a display device 4. The display device 4 is, e.g., a flat panel display device. The display device 4 may be configured integrally with the crystal phase identification unit 3.

Figure 2:
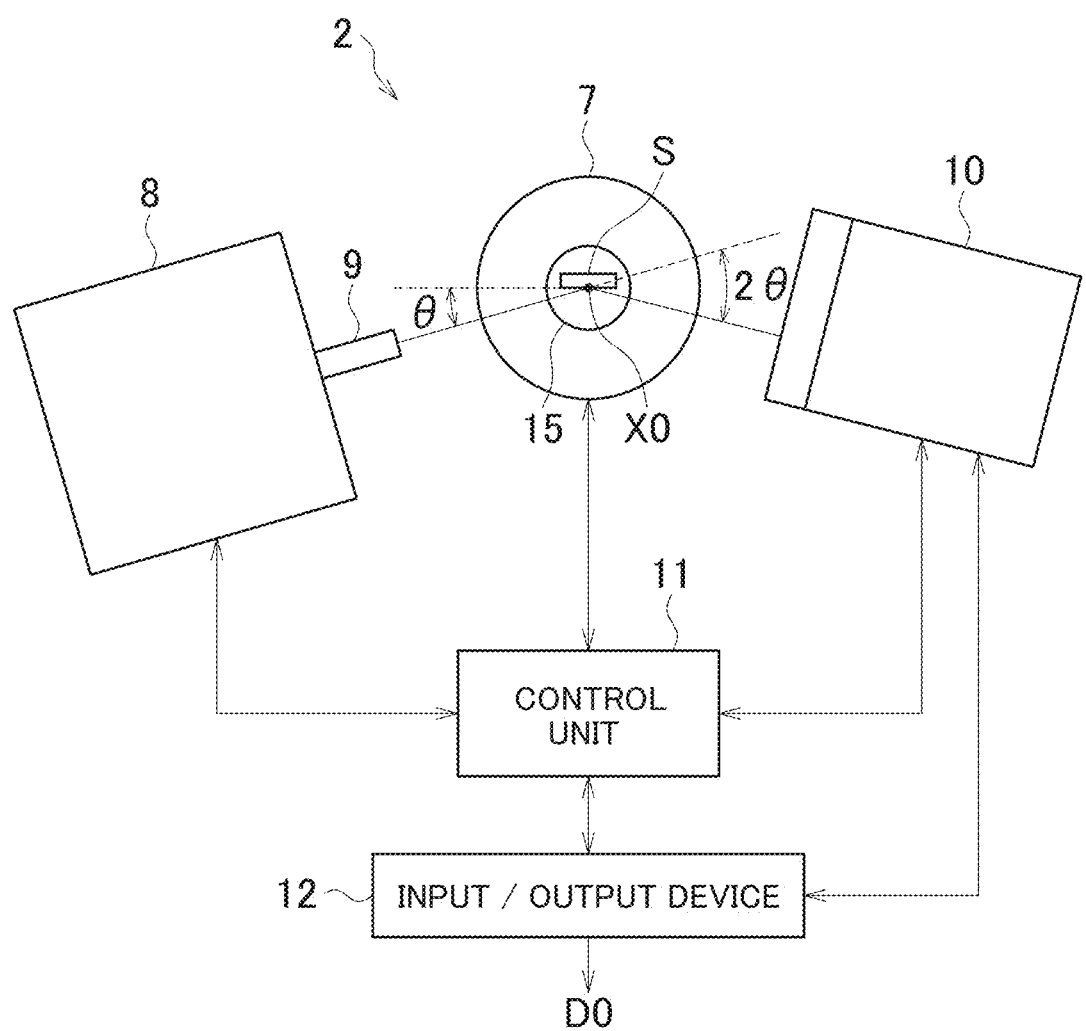
FIG. 2 is a diagram showing one embodiment of the X-ray diffractometer in FIG. 1.

The X-ray diffractometer 2 has a goniometer 7, an X-ray generation device 8, a collimator 9, an X-ray detector 10, a control unit 11, and an input/output device 12, as shown in FIG. 2. The goniometer 7 is an angle-measuring instrument. A sample stage 15 that supports a sample S and rotates is provided to a central portion of the goniometer 7. The sample stage 15 rotates about a central axis (axis passing through the plane of the drawing depicting FIG. 2) X0 that passes therethrough. The collimator 9 has a pinhole for narrowing X-rays into a beam shape.

The X-ray detector 10 is a two-dimensional X-ray detector capable of detecting the position of X-rays within a two-dimensional region (i.e., within a flat region) in addition to having a function for detecting X-ray intensity. The X-ray detector 10 can instead be configured as a zero-dimensional X-ray detector or a one-dimensional X-ray detector. A zero-dimensional X-ray detector has only a function for detecting X-ray intensity, and does not have position detection capability. A one-dimensional X-ray detector is capable of detecting the position of X-rays within a one-dimensional region (i.e., within a linear region) in addition to having a function for detecting X-ray intensity. When a zero-dimensional X-ray detector or a one-dimensional X-ray detector is used, it is necessary to move the sample or X-ray detector in a linear or rotating manner in order to obtain position information of the X-rays within the flat region. Even when a two-dimensional X-ray detector is used, if the X-ray detection surface of the two-dimensional X-ray detector is small, the two-dimensional X-ray detector may be moved in a linear or rotating manner in order to obtain position information of the X-rays within a broader flat region.

X-rays generated by the X-ray generation device 8 assume the shape of a narrow beam-shaped bundle while passing through the collimator 9. The sample S is irradiated with the beam-shaped X-rays. When a prescribed X-ray diffraction condition is satisfied between the X-rays irradiating the sample S and a crystal lattice plane within the sample S, the X-rays are diffracted by the sample S. The X-ray detector 10 detects the X-rays diffracted by the sample S. As shown in FIG. 2, when the X-rays are incident on the crystal lattice plane within the sample S at an angle θ, the diffraction angle of the X-rays is 2θ. The size of the diffraction angle 2θ is twice that of the incident angle θ.

The control unit 11 is formed from a computer, a sequencer, a dedicated circuit, or the like. The control unit 11 controls the operations of each of the goniometer 7, the X-ray generation device 8, and the X-ray detector 10. The input/output device 12 transmits measurement conditions and various other signals to the control unit 11. The input/output unit 12 also transmits output data from the X-ray detector 10 to the crystal phase identification unit 3 in FIG. 1. FIG. 2 shows a reflective X-ray diffractometer, but the X-ray diffractometer may instead be a transmissive X-ray diffractometer.

The crystal phase identification unit 3 has an input unit 16, a storage unit 17, an analysis unit 18, and an output unit 19 in FIG. 1. The crystal phase identification unit 3 can be configured from a typical computer. In such a case, the input unit 16 can be realized using an input interface, the output unit 19 can be realized using an output interface, the storage unit 17 can be realized using a hard disk, memory, or other such device, and the analysis unit 18 can be realized using a central processing unit (CPU) or the like.

The storage unit 17 functions as a database. Information pertaining to X-ray diffraction patterns for a known plurality of crystal phases is registered in the database. Specifically, data about the position and intensity ratio of peaks in 2θ-I profiles for a known plurality of crystal phases is registered. More specifically, data (d-I data) about "the intensity ratio I" versus "the distance d of crystal lattice planes" is registered.

Figure 3:
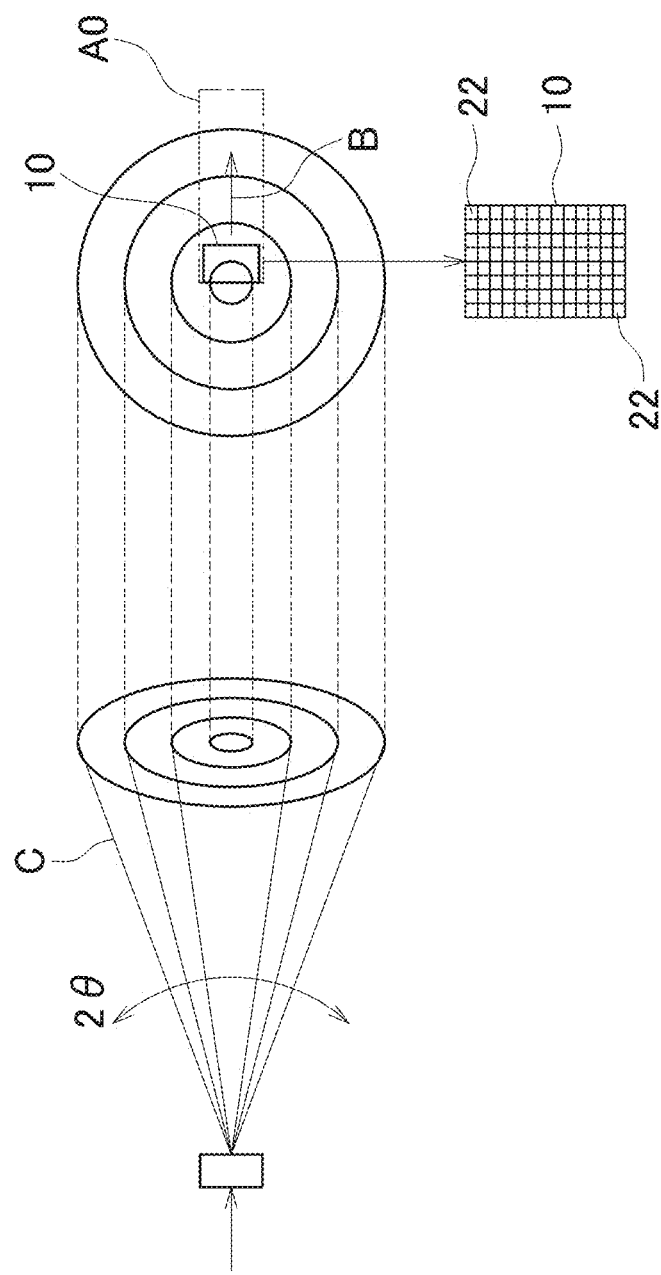
FIG. 3 is a diagram showing Debye rings and an X-ray detector.

In the present embodiment, numerous pixels 22 are aligned in a planar manner on the X-ray detection surface of the two-dimensional X-ray detector 10, as shown in FIG. 3. The two-dimensional X-ray detector 10 is moved in a scanning manner as indicated by arrow B, whereby X-ray information about a prescribed detection region A is acquired. In FIG. 2, X-ray diffraction data D0 is outputted from an output terminal of the input/output device 12. The X-ray diffraction data D0 is formed by individual output signals from the plurality of pixels 22 constituting the X-ray detection surface of the two-dimensional X-ray detector 10.

The X-ray diffraction data D0 is transmitted to the analysis unit 18 via the input unit 16 of the crystal phase identification unit 3 in FIG. 1. The analysis unit 18 transmits the transmitted X-ray diffraction data D0 to the storage unit 17. The storage unit 17 stores the transmitted X-ray diffraction data D0. The analysis unit 18 reads out the X-ray diffraction data D0 from the storage unit 17 at a discretionary timing at which analysis is required. The analysis unit 18 performs pre-processing on the read-out X-ray diffraction data D0. The pre-processing includes, e.g., background correction for eliminating noise. The background correction typically includes uniform background correction or median filter correction. A data processing unit for performing pre-processing as described above can be provided inside the X-ray diffractometer 2. In such a case, it is unnecessary to perform pre-processing again using the analysis unit 18.

Figure 4:
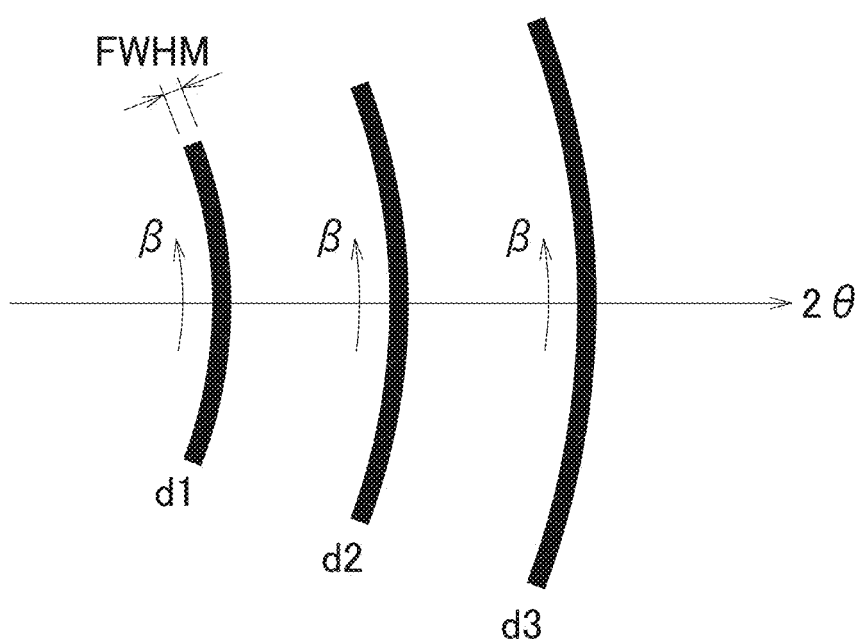
FIG. 4 is a diagram schematically showing a portion of Debye rings.

FIG. 4 schematically shows portions d1, d2, d3 of a plurality of Debye rings obtained from one sample. The direction indicated by arrow 2θ is a diffraction angle 2θ direction, and the β directions orthogonal thereto are circumferential directions of the Debye rings. After the above-mentioned pre-processing is performed, the analysis unit 18 in FIG. 1 generates 2θ-I data on the basis of the X-ray diffraction data D0. The 2θ-I data indicates X-ray intensity values at each angular position along the diffraction angle 2θ direction.

The analysis unit 18 generates image data on the basis of the generated 2θ-I data and supplies the image data to the display device 4 via the output unit 19. A one-dimensional diffraction profile indicated by reference P1 in FIG. 5, or a one-dimensional diffraction profile indicated by reference P1 in FIG. 6, is thereby displayed within a display screen of the display device 4 in FIG. 1.

In addition to generating the 2θ-I data, the analysis unit 18 generates β-I data. The β-I data indicates X-ray intensity values at each angular position along the circumferential directions β of each of the Debye rings d1, d2, d3 in FIG. 4. The analysis unit 18 generates image data on the basis of the generated β-I data and supplies the image data to the display device 4 via the output unit 19. A two-dimensional diffraction pattern including the plurality of Debye rings d1, d2, d3 such as is shown by the two-dimensional diffraction pattern P2 in FIG. 7 is thereby displayed within the display screen of the display device 4 in FIG. 1.

Figure 6:
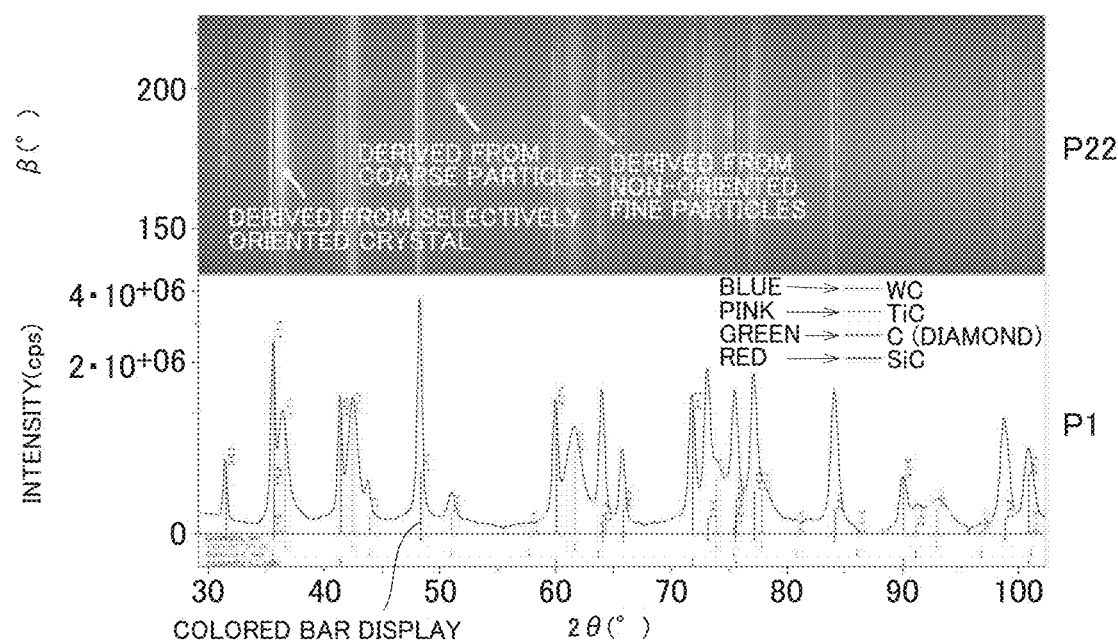
FIG. 6 is a diagram showing another embodiment of the display method according to the present invention.
Figure 7:
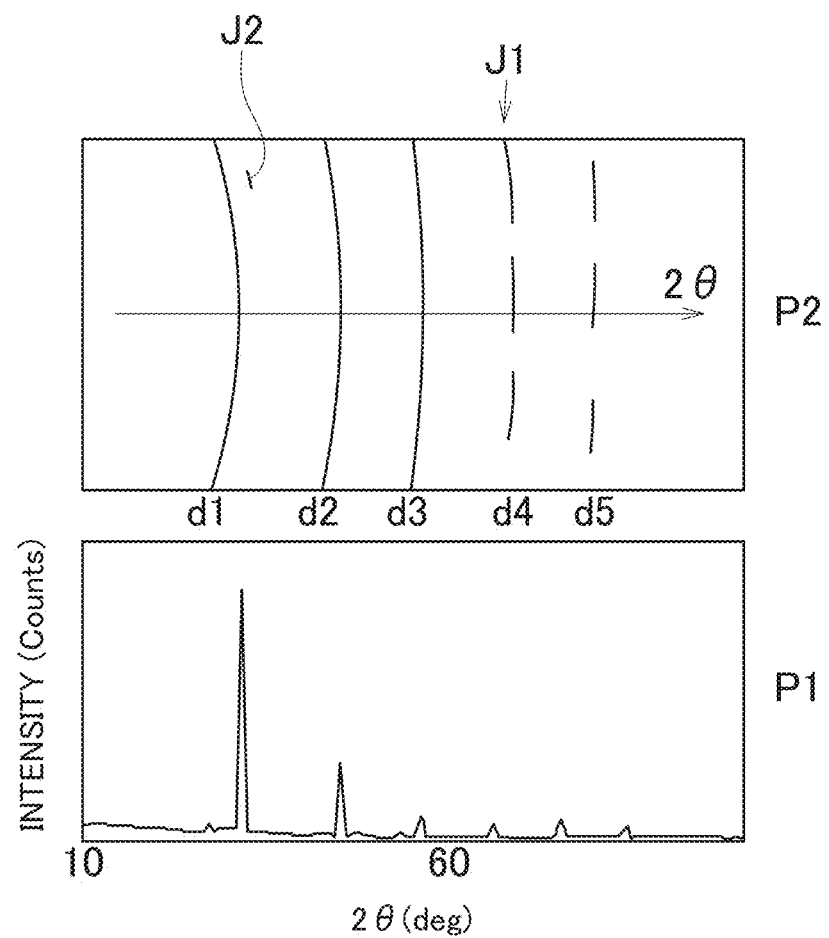
FIG. 7 is a diagram showing a reference example of a method for displaying measurement results.

In addition to generating image data for displaying the β-I data as a ring-shaped two-dimensional image, such as is shown by the two-dimensional diffraction pattern P2 in FIG. 7, the analysis unit 18 generates image data for displaying the β-I data as a linear two-dimensional image. Such image data may be referred to below as data for a linear-display-format image. Also, a two-dimensional diffraction pattern including a linear two-dimensional image displayed by use of the linear-display-format image data may be referred to as a linear-display-format two-dimensional diffraction pattern. When such linear-display-format image data is supplied to the display device 4 via the output unit 19, a two-dimensional diffraction pattern that includes linear X-ray intensity information such as is indicated by reference P22 in FIG. 5, or a two-dimensional diffraction pattern that includes linear X-ray intensity information such as is indicated by reference P22 in FIG. 6, is displayed within the display screen of the display device 4.

Figure 5:
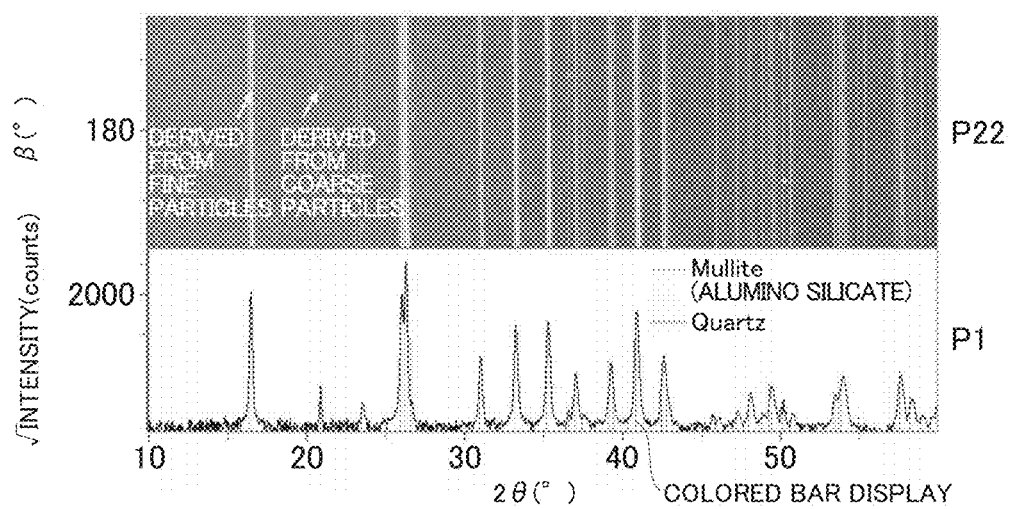
FIG. 5 is a diagram showing one embodiment of the display method according to the present invention.

The analysis unit 18 furthermore generates image data for displaying the one-dimensional diffraction profile P1 and the linear-display-format two-dimensional diffraction pattern P22 so as to be aligned, as shown in FIGS. 5 and 6, and supplies the image data to the display device 4. More specifically, the one-dimensional diffraction profile P1 and the linear-display-format two-dimensional diffraction pattern P22 are displayed so as to be aligned vertically such that the horizontal-axis values; i.e., the angle values for the diffraction angle 2θ, of the one-dimensional diffraction profile P1 and the linear-display-format two-dimensional diffraction pattern P22 coincide.

In the present embodiment as described above, image data for the two-dimensional diffraction pattern is converted such that X-ray intensity data for the same 2θ angle in the two-dimensional diffraction pattern P22 is displayed linearly, and furthermore the two-dimensional diffraction pattern P22 and the one-dimensional diffraction profile P1 are displayed so as to be aligned such that the horizontal axis (2θ axis) of the two-dimensional diffraction pattern P22 accurately coincides with the horizontal axis (2θ axis) of the one-dimensional diffraction profile P1, as shown in FIGS. 5 and 6. This makes it possible to visually, quickly, easily, and accurately recognize to which 2θ angular position a frag-mentary diffraction image or spot-shaped diffraction image in the two-dimensional diffraction pattern P22 belongs.

Additionally, in the present embodiment, in order to indicate a candidate for a contained crystal phase or indicate a result following crystal phase identification in the one-dimensional diffraction profile P1, the position and intensity of diffraction peaks obtained from substances are displayed using colored bars (i.e., straight lines). For example, in FIG. 6, as pertains to each of the one-dimensional diffraction profile P1 and the two-dimensional diffraction pattern P22, information derived from tungsten carbide (WC) is indicated by a blue color, information derived from titanium carbide (TiC) is indicated by a pink color, information derived from diamond (C) is indicated by a green color, and information derived from silicon carbide (SiC) is indicated by a red color.

According to the present embodiment, because X-ray intensity information in the circumferential direction of a Debye ring is displayed not in a ring shape but rather linearly in the two-dimensional diffraction pattern P22, it is possible to display, in an overlaid manner on the two-dimensional diffraction pattern P22, bars that are exactly the same as the colored bars in the one-dimensional diffraction profile P1. As a result, it is possible in particular to easily recognize the position, on the two-dimensional diffraction pattern P22, of a diffraction peak of a candidate for a contained crystal phase. This feature provides an especially great advantage for users.

(Enlarged Display)

Figure 8:
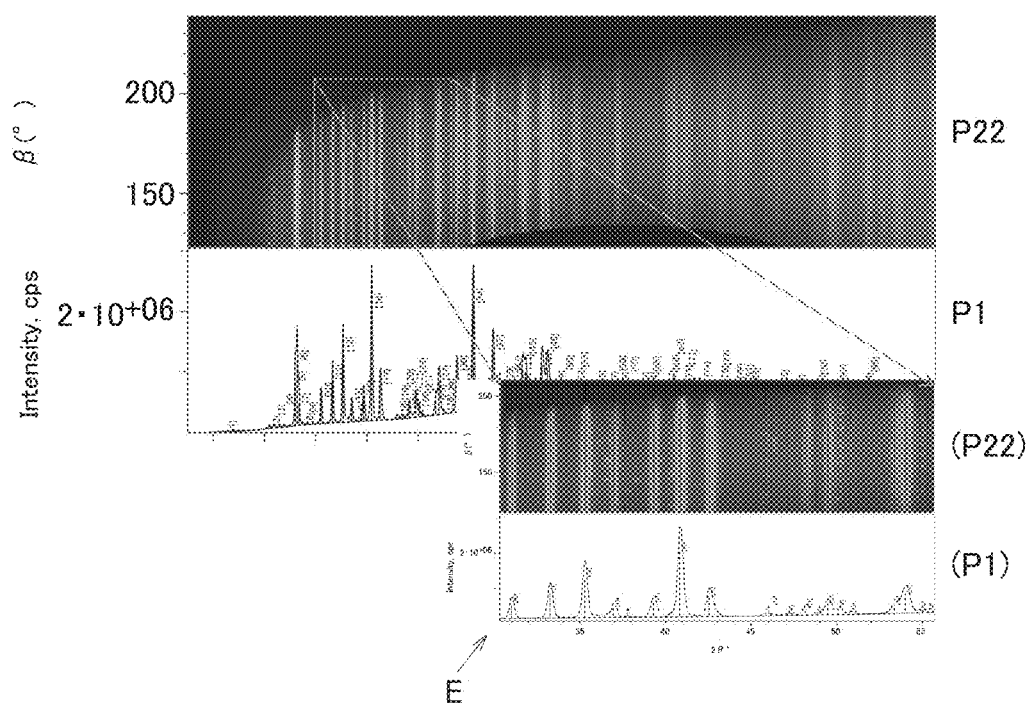
FIG. 8 is a diagram showing a further embodiment of the display method according to the present invention.

In the present embodiment, when a desired 2θ angle range (desired range on horizontal axis) is designated as shown in FIG. 8, the analysis unit 18 in FIG. 1 displays range portions that correspond to both the linear-display-format two-dimensional diffraction pattern P22 and the one-dimensional diffraction profile P1 in an enlarged state, as indicated by reference E. In particular, the two-dimensional diffraction pattern P22 and the one-dimensional diffraction profile P1 are displayed so as to be enlarged at the same ratio. This makes it possible to quickly, easily, and accurately recognize a fragmentary diffraction image or spot-shaped diffraction image in the two-dimensional diffraction pattern P22. The 2θ angle range may be designated on the two-dimensional diffraction pattern P22, or may be designated on the one-dimensional diffraction profile P1.

When the Debye rings are displayed in a ring-shaped state as shown by the two-dimensional diffraction pattern P2 in FIG. 7, if the Debye rings appear as fragmentary images or spot-shaped images, it may be difficult to ascertain to which 2θ diffraction angle the images belong. In particular, when a portion of the two-dimensional diffraction pattern is displayed in an enlarged state, it is even more difficult to ascertain to which 2θ diffraction angle the images belong. Conversely, in the present embodiment, a diffraction image corresponding to the Debye ring in the two-dimensional diffraction pattern P22 in FIG. 8 is displayed linearly, and moreover the 2θ axis (horizontal axis) of the one-dimensional diffraction profile P1 coincides with the 2θ axis of the two-dimensional diffraction pattern P22. Therefore, it is possible to quickly, easily, and accurately recognize the 2θ angular position of a fragmentary diffraction image or spot-shaped diffraction image present in the enlarged display.

Example 1

In FIG. 2, a sample S including mullite (aluminosilicate) and quartz was placed on a sample stage 15. The sample S was then irradiated with X-rays, and a two-dimensional X-ray detector 10 was moved in a rotating manner about the sample S along a diffraction angle 2θ so that a 2θ angle range of 10-60° could be reached as a detection region. The diffracted X-rays from the sample S were then detected by the two-dimensional X-ray detector 10.

On the basis of X-ray diffraction data for each pixel outputted from the two-dimensional X-ray detector 10, measurement results were displayed within a screen of the display device 4 in FIG. 1, and the display shown in FIG. 5 was obtained. In FIG. 5, a one-dimensional diffraction profile P1 and a linear-display-format two-dimensional diffraction pattern P22 were displayed so as to be aligned such that the 2θ angle values on 2θ axes coincided. In the two-dimensional diffraction pattern P22, in which Debye rings are displayed linearly, it was recognized that the intensity in the circumferential direction of Debye rings derived from fine particles was homogeneous. It was also recognized that diffraction images derived from coarse particles appeared in a spot shape. The values of the 2θ angular positions of these spot-shaped diffraction images could easily be visually confirmed.

Example 2

In FIG. 2, a sample S including tungsten carbide (WC), titanium carbide (TiC), diamond (C), and silicon carbide (SiC) was placed on a sample stage 15. The sample S was then irradiated with X-rays, and a two-dimensional X-ray detector 10 was moved in a rotating manner about the sample S along a diffraction angle 2θ so that a 2θ angle range of 30-110° could be reached as a detection region. The diffracted X-rays from the sample S were then detected by the two-dimensional X-ray detector 10.

On the basis of X-ray diffraction data for each pixel outputted from the two-dimensional X-ray detector 10, measurement results were displayed within a screen of the display device 4 in FIG. 1, and the display shown in FIG. 6 was obtained. In FIG. 6, a one-dimensional diffraction profile P1 and a linear-display-format two-dimensional diffraction pattern P22 were displayed so as to be aligned such that the 2θ angle values on 2θ axes coincided. In the two-dimensional diffraction pattern P22, in which Debye rings are displayed linearly, it was recognized that diffraction images derived from selectively oriented crystals appeared in a partial manner in the circumferential direction. It was also recognized that diffraction images derived from coarse particles appeared in a spot shape. The values of the 2θ angular positions of these spot-shaped diffraction images could easily be visually confirmed. It was also recognized that diffraction images derived from non-oriented fine particles appeared to be homogeneous in the circumferential direction.

Second Embodiment

The inventors proposed the following method for identifying crystal phases in Japanese Patent Laid-open Publication No. 2017-211251 corresponding to US2017/0343492A1. Specifically, proposed was a method for identifying crystal phases, the method having:

(1) a step for producing, on the basis of two-dimensional X-ray diffraction data that comprises output signals from the two-dimensional X-ray detector 10 in FIG. 2, X-ray intensity data; i.e., β-I data for each angular position in the circumferential directions β of the Debye rings in FIG. 4;

(2) a step for sorting two-dimensional diffraction patterns that correspond to the Debye rings in FIG. 4 into a plurality of clusters on the basis of the above-mentioned β-I data; and (3) a step for searching for a candidate for a crystal phase contained in a sample from a prescribed database on the basis of a set comprising the position and the intensity ratio of peaks in two-dimensional diffraction patterns that were sorted into the same cluster.

In the above description, a "cluster" is an aggregate of substances or physical quantities that have the same attributes. The "prescribed database" is a database in which data about the position and intensity ratio of peaks in X-ray diffraction patterns is registered in advance for each of a plurality of crystal phases.

This method for identifying crystal phases has the following characteristics.

(A) The position and intensity of peaks in a plurality of diffraction patterns (e.g., the plurality of ring-shaped diffraction images d1-d5 in the two-dimensional diffraction pattern P2 in FIG. 7) are determined from X-ray diffraction data outputted from an X-ray detector (e.g., reference 10 in FIG. 2), and data about "the X-ray intensity" versus "the angle in the circumferential direction (e.g., the β direction in FIG. 4)" is produced for each diffraction pattern. The plurality of diffraction patterns indicate rings included in a plurality of concentric Debye rings.

(B) The diffraction patterns are sorted into a plurality of clusters on the basis of the produced data about "the X-ray intensity" versus "the angle in the circumferential direction." The diffraction patterns are thereby sorted into the plurality of clusters in accordance with uniformity in the circumferential direction.

(C) A search for a candidate for a crystal phase included in a sample from a prescribed database is performed on the basis of a set comprising the position and the intensity ratio of peaks in diffraction patterns that were sorted into the same cluster. A crystal phase candidate search is thereby performed on the basis of sets of diffraction patterns for which the uniformity in the circumferential direction is similar. Therefore, in identification of the crystal phases, the crystal phase candidate search is performed with greater precision and the analysis precision is also improved.

Furthermore, in the method for identifying crystal phases described above, ring characteristic factors representing the degree of circumferential-direction uniformity in the intensity of the diffraction patterns can be determined from data about "the X-ray intensity" versus "the angle in the circumferential direction" of the diffraction patterns, and the diffraction patterns can be sorted into the plurality of clusters in accordance with the determined ring characteristic factors. "Ring characteristic factor" is a neologism, conceived of by the inventors, that refers to elements representing the degree of circumferential-direction uniformity in the intensity of diffraction patterns. Ring characteristic factors clarify the uniformity in the circumferential direction of the diffraction patterns. Therefore, sorting the diffraction patterns into a plurality of clusters in accordance with the determined ring characteristic factors makes it possible to sort diffraction patterns having differing degrees of uniformity in the circumferential direction into different clusters. The various values indicated in FIG. 9, where the X-ray intensity I in the β-I data is represented as variable X, can be applied as "ring characteristic factors."

Figure 10:
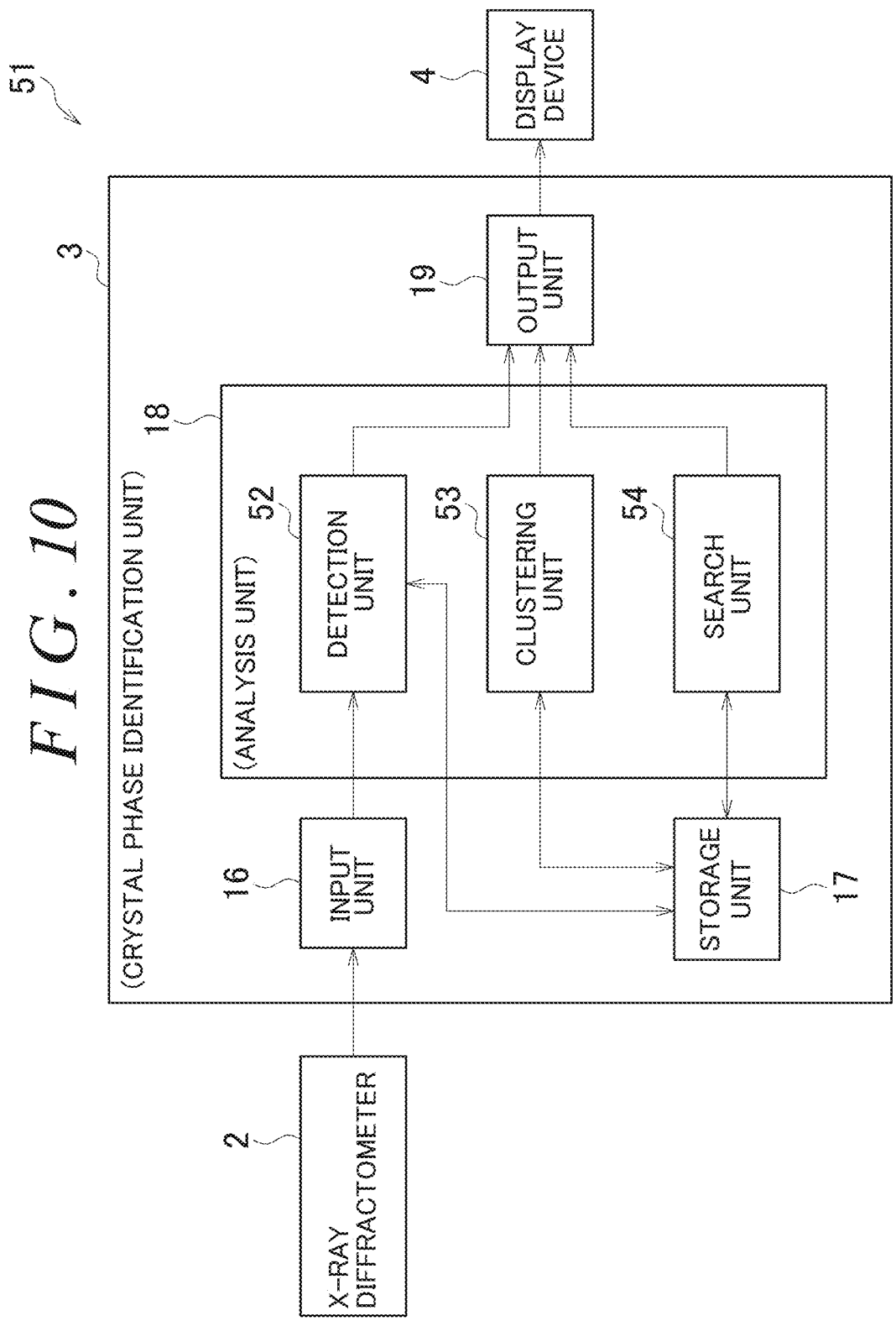
FIG. 10 is a diagram showing a further embodiment of an X-ray diffraction measurement apparatus in which the display method according to the present invention is used.

FIG. 10 shows an X-ray diffraction measurement apparatus 51 applied to the second embodiment. In the X-ray diffraction measurement apparatus 51, elements that are the same as the configuration elements of the X-ray diffraction measurement apparatus 1 shown in FIG. 1 are labelled with the same references. In the X-ray diffraction measurement apparatus 51, the analysis unit 18 has a detection unit 52, a clustering unit 53, and a search unit 54. These units can be realized using an operation part of a CPU.

The detection means 52 reads out X-ray diffraction data stored in the storage unit 17, performs pre-processing on X-ray diffraction data, and then converts the X-ray diffraction data to 2θ-I data. The detection unit 52 detects the position and intensity of peaks in a 2θ-I profile. This process is referred to as a "peak search." The detection unit 52 produces data (i.e., β-I data) about "the X-ray intensity I" versus "the angle β in the circumferential direction" in diffraction patterns at the position of peaks in the 2θ-I profile. The detection unit 52 calculates or produces ring characteristic factors from the β-I data.

The clustering unit 53 sorts the diffraction patterns into a plurality of clusters in accordance with the ring characteristic factors.

The search unit 54, under the hypothesis that some or all of the diffraction patterns included in the same cluster are derived from the same crystal phase, searches a database for a crystal phase showing peak positions and peak intensity ratios that highly conform with a set comprising the position and the intensity ratio of peaks in diffraction patterns that were sorted into the same cluster and extracts a crystal phase candidate.

According to the X-ray diffraction measurement in the present embodiment, the measured two-dimensional diffraction patterns and the registered information within the database are compared in consideration of uniformity in the circumferential direction of two-dimensional diffraction patterns that correspond to Debye rings. Therefore, the present embodiment avoids an undesirable circumstance in which a crystal phase candidate is listed in a search result on the basis of a set of diffraction patterns having differing degrees of uniformity in the circumferential direction. As a result, it is possible to perform highly precise analysis.

The X-ray diffraction measurement of the present embodiment is configured such that a search is performed in consideration of uniformity in the circumferential direction of two-dimensional diffraction patterns that correspond to Debye rings, as described above, wherein the X-ray diffraction measurement is furthermore configured such that a one-dimensional diffraction profile P1 and a linear-display-format two-dimensional diffraction pattern P22 are displayed so as to be aligned such that the 2θ angular positions coincide, as shown in FIGS. 5 and 6. The present embodiment thereby makes it possible to simultaneously recognize screen displays such as are shown in FIGS. 5 and 6; i.e., screen displays in which the relationship between circumferential-direction (β-direction) X-ray intensity information and the 2θ angular positions is clearly represented, when the process is executed in consideration of the uniformity in the circumferential direction of the diffraction pattern. Therefore, an analysis can be performed with especially high reliability.

Other Embodiments

The present invention was described above using the example of preferred embodiments, but the present invention is in no way limited by these embodiments; a variety of modifications can be made within the scope of the invention recited in the claims.

For example, in the embodiments described above, the present invention is applied to powder X-ray diffraction measurement, but the present invention can instead be applied to types of X-ray diffraction measurement other than powder X-ray diffraction measurement.

DESCRIPTION OF SYMBOLS

1: X-ray diffraction measurement apparatus, 2: X-ray diffractometer, 3: Crystal phase identification unit, 4: Display device, 7: Goniometer, 8: X-ray generation device, 9: Collimator, 10: X-ray detector, 11: Control unit, 12: Input/output device, 15: Sample stage, 22: Pixel, 51: X-ray diffraction measurement apparatus, A0: Detection region, C: Cone, d1, d2, d3: Debye ring, D0: X-ray diffraction data, E: Enlarged display, J1: Information about whether preferred orientation is strong, J2: Information about whether coarse particles are present, P1: One-dimensional diffraction profile, P2: Two-dimensional diffraction pattern, P22: Linear-display-format two-dimensional diffraction pattern, S: Sample, X0: Central axis

The invention claimed is:

1. A method for displaying measurement results from X-ray diffraction measurement, which is a measurement in which a sample is irradiated with X-rays outputted from an X-ray generation device and the X-rays diffracted by the sample are detected by an X-ray detector, wherein the method comprises:
   realizing, through a processor, a feature for forming a one-dimensional diffraction profile by displaying, on the basis of output data from the X-ray detector, a 2θ-I profile within a coordinate system in which one orthogonal coordinate axis shows 2θ angle values and another orthogonal coordinate axis shows X-ray intensity values;
   realizing, through a processor, a feature for forming a two-dimensional diffraction pattern by linearly displaying X-ray intensity data at each angular position along circumferential directions of a plurality of Debye rings formed at each 2θ angle by X-rays diffracted by the sample; and
   realizing, through a processor, a feature for displaying the two-dimensional diffraction pattern and the one-dimensional diffraction profile so as to be aligned such that the 2θ angle values of both coincide with each other.

2. The method for displaying measurement results from X-ray diffraction measurement according to claim 1, wherein when a desired enlargement range in the two-dimensional diffraction pattern or in the one-dimensional diffraction profile is designated, both the two-dimensional diffraction pattern and the one-dimensional diffraction profile in the designated range are displayed so as to be enlarged at the same ratio and in an aligned state.

3. The method for displaying measurement results from X-ray diffraction measurement according to claim 1, wherein the X-ray diffraction measurement has a step for performing a crystal phase candidate search in consideration of uniformity in the circumferential direction of the Debye rings.

4. The method for displaying measurement results from X-ray diffraction measurement according to claim 3, wherein the method comprises:
   a step for determining β-I data, which is data about "the X-ray intensity" versus "the angle in the circumferential direction of the Debye rings";
   a step for classifying the diffraction patterns that correspond to the Debye rings into clusters on the basis of the β-I data; and a step for performing a crystal phase candidate search within the same clusters.

5. The method for displaying measurement results from X-ray diffraction measurement according to claim 1, further comprising a step of determining, on the basis of the aligned two-dimensional diffraction pattern and one-dimensional diffraction profile, to which 2θ angular position a fragmentary image or spot-shaped image in the two-dimensional diffraction pattern belongs.

* * * * *